United States Patent
Newman

[11] Patent Number: 6,148,249
[45] Date of Patent: Nov. 14, 2000

[54] IDENTIFICATION AND TRACKING OF ARTICLES

[76] Inventor: Paul Bernard Newman, Northcote House, Northlew, Okehampton, Devon, EX20, 3BT, United Kingdom

[21] Appl. No.: 08/896,984

[22] Filed: Jul. 18, 1997

[30] Foreign Application Priority Data

Jul. 18, 1996 [GB] United Kingdom .................... 9615057

[51] Int. Cl.[7] .................................................. G06F 15/20
[52] U.S. Cl. .......................... 700/225; 700/224; 700/223; 700/226
[58] Field of Search .......................... 364/478.15, 478.14, 364/478.13, 478.12, 478.11, 478.1; 235/456, 470; 700/225, 224, 223, 226

[56] References Cited

U.S. PATENT DOCUMENTS

| | | | |
|---|---|---|---|
| 4,228,685 | 10/1980 | Wallace et al. ............................. | 73/432 |
| 4,558,318 | 12/1985 | Katz . | |
| 4,597,495 | 7/1986 | Knosby ............................... | 364/478.12 |
| 4,610,361 | 9/1986 | Elliot ................................... | 364/478.11 |
| 4,909,250 | 3/1990 | Smith ...................................... | 606/117 |
| 4,941,181 | 7/1990 | Igarashi et al. ..................... | 364/478.13 |
| 4,964,053 | 10/1990 | Humble .............................. | 364/478.13 |
| 5,128,528 | 7/1992 | Heninger ................................ | 235/470 |
| 5,411,435 | 5/1995 | Durand .................................... | 452/198 |
| 5,478,990 | 12/1995 | Montanari et al. ...................... | 235/375 |
| 5,498,202 | 3/1996 | Vande Berg ............................. | 452/184 |
| 5,568,392 | 10/1996 | Flickner et al. ................... | 364/478.15 |
| 5,964,656 | 10/1999 | Lawler, Jr. et al. ..................... | 452/173 |

FOREIGN PATENT DOCUMENTS

| | | |
|---|---|---|
| 161725 | 8/1991 | Denmark . |
| 0 307 335 | 3/1989 | European Pat. Off. . |
| 41 32 830 | 7/1993 | Germany . |
| 8700336 | 9/1988 | Netherlands . |
| 2 206 716 | 1/1989 | United Kingdom . |
| 2 212 310 | 7/1989 | United Kingdom . |
| 2 289 151 | 11/1995 | United Kingdom . |
| 96/13015 | 5/1996 | WIPO . |

*Primary Examiner*—Christopher P. Ellis
*Assistant Examiner*—Michael E. Butler
*Attorney, Agent, or Firm*—Larson & Taylor, PLC

[57] ABSTRACT

Machine readable marks are applied to articles, particularly primal cuts of meat, preferably before removal from a carcass. They can thus be monitored during progress and data can be fed back to a central computer which may compute a value for the carcass. A preferred mark is a 3×3 matrix having two columns of colored dots selected from colors representing 0, 2, 4, 6 and 8; and a modifying column providing binary information indicating that 0 or 1 should be added to the values of adjacent colored dots.

15 Claims, 3 Drawing Sheets

IDENTIFICATION AND TRACKING OF ARTICLES

This invention relates to the identification and tracking of articles, particularly but not exclusively carcasses and primal cuts of meat. It is also concerned with determining the value of a carcass.

The meat industries of the industrialised countries continue to experience increasing pressure on financial margins, with ever increasing producer raw material costs on the one hand and retail and consumer reluctance to pay increased prices on the other. Consequently, those involved in the meat chain, especially those involved in manufacturing and processing, look for a continual improvement in cost performance. Despite the fact that the basic raw material cost, that is the cost of the animal itself, accounts for something like 70% of the end product cost, the majority of effort aimed at reducing cost has been directed at the remaining 30%, which includes such things as labour, transport, production and manufacturing costs, and overheads. The reason behind this apparent paradox is the difficulty of introducing suitable control measures that will reliably and consistently reduce the cost of the meat itself. Possibly the greatest single obstacle to overcoming this problem is the inability to gather reliable quantitative information on the value of the constituent parts of carcasses.

The value of any meat carcass is the sum of the values of the individual cuts of meat and meat products derived from that carcass. Nevertheless, the cost of the carcass—that is, the money paid to the producer of the animal from which the carcass was derived—is determined not as an aggregate of the true cost of the constituent cuts, but rather reliance is placed on a variety of manual and semi-automated methods for carcass grading. However, as has been demonstrated in trial after trial, the ability of any of these methods to predict the yield of carcasses is moderate at best: typically, the correlation between carcass grade and yield is at best only about 0.65, and furthermore the manual methods in particular are prone to unsatisfactory reproducibility.

Apparatus capable of assessing or predicting physical and quality criteria of primals and cuts, reliably and at speeds to match today's meat processing lines, has only recently become available. The introduction of a mechanism by means of which it would be possible to take the accurate measurements and estimations derived from primals and the later manufacturing operations and relate these data directly to the carcass from which they were derived would generate very significant benefits, financial and otherwise. Such technology would facilitate the adoption of manufacturing techniques such as "just-in-time" manufacturing and computer-integrated manufacturing which have achieved considerable acceptance in other manufacturing industries. It would also facilitate greater control over the selection of starting materials, and provide a much fairer and more accurate mechanism for calculating the value of a carcass thereby ensuring a fairer payment to the producer. The considerable improvement in determining the real value of a carcass, together with detailed information on the relative values of the constituent primals and/or cuts, would also provide producers (especially the specialist producers such as genetics/breeding companies) reliable data to help evaluate bloodstock lines, husbandry practices, and feeding regimes. Manufacturers, producers and genetics/breeding companies would be able to develop detailed, quantitatively accurate intensive databases on performance criteria and characteristics of individual breeding and producer lines but in a fraction of the time and at a fraction of the cost that it currently takes. The system described herein provides such a mechanism.

The benefits offered by the present invention are not confined to the production, slaughtering, and cutting end of the meat production chain, but can be easily extended to the benefit of the caterer, wholesaler, and consumer, both in terms of quality assurance and public health. They are applicable to articles other than meat, particularly other articles whose history is important such as other food articles, e.g. eggs.

The pork industry can be considered as comprising four sectors: live animal, carcass, primal, and finished product. Finished product identification is already dominated by bar-coding, or alpha-numeric character recognition in various forms. Products for identifying the live animal are limited both in type and application. Low cost items such as ear tags are widely used. Automated identification systems such as radio tags, although available for several years, have achieved very limited application primarily due to cost (including costs associated with a high labour content). There is also the difficulty in recovering the radio tag after slaughter, especially since animals from a single source may be slaughtered at several abattoirs separated by a considerable distance.

The carcass area is the sector where the market for identification products has expanded fastest recently owning to the relative simplicity of the approaches adopted. After slaughter, the carcass is placed on a gambrel suspended from an overhead conveyor. (In smaller operations tis occurs immediately after stunning, in larger ones it occurs after the primary washing and dehairing stages.) Most current commercial systems of carcass identification rely on the installation of an identification system of the gambrel itself; in a similar manner, sides or meat cuts may be identified by being suspended from the overhead conveyor on hooks similarly provided with such devices. These devices can take the form of radio frequency or microwave transponders. Alternatively, the gambrel or hook may be marked, typically using a welded plate on which a unique identification is displayed. However, the capital cost of such systems is high. Additionally, as the damage and failure rate of gambrels under factory conditions is typically about 1% per month, and with most gambrels having a life of about 3 years, the maintenance and repair cost of such systems can also be exceedingly high. Thus, systems of this sort are usually limited to large throughput factories, as the relative costs increase for smaller capacity ones. Alternative approaches include providing gambrels or hooks with unique bore patterns (eg NL8700336; DE4132830) which can be read by linear photocell arrays; alphanumeric symbols which can be read by a video camera linked to a computer provided with pattern recognition software (eg DK8904650); and systems which allow the code to be changed (eg DE4132830). The main drawback of this type of system is the limitations of the approach. Little objective information in terms of meat yield and quality can be captured early on in the processing cycle, although carcass weight and manual probe measurements for carcass fatness are often made. Far more quantitative data for each carcass are available once carcass break-up commences. However, this occurs only after the carcass, side, or primal has been dismounted from the gambrel or hook, and once this occurs, individual carcass identity is lost using currently available technology.

This specification describes a carcass primal marking and tracking system, linkable to a small central computer, that receives data from a range of measurement stations, collates these data to produce a total carcass record, and, from this total carcass record, determines the value of the carcass. Once the value of the carcass has been calculated, payment can be made to the producer based on the quantitative information received. This can eliminate all the guesswork and perceived value problems, as the producer is paid exactly what the carcass is worth to the abattoir with most yield and quality attributes taken into account. Furthermore, the manufacturer will be able to select producers on the basis of the carcasses obtained from the animals supplied satisfying his product requirements.

According to a first aspect of the present invention there is provided a method of identifying and tracking articles, particularly carcasses and primal cuts, comprising a) applying an identifying machine-readable mark to at least one article (e.g. a primal of a carcass preferably before said primal is removed from the carcass); b) if appropriate, removing said marked primal from the carcass; c) moving said article to a reading and assessment station; d) reading the mark at the station and recording the mark; e) identifying the appropriate record in a database from the mark read at step d; and f) passing the location of the article to a central unit. In this and other aspects of the invention as applied to carcasses, it is preferred for a plurality of the primals (e.g. all of them) to receive such marks, which are preferably distinguishable.

According to a second aspect of the invention there is provided a method for determining the value of a carcass, comprising a) applying an identifying machine-readable mark to at least one primal of the carcass before said primal is removed from the carcass; b) removing said marked primal from the carcass; c) moving said primal to a reading and assessment station; d) reading the mark on the primal at the station and recording the mark; e) identifying the appropriate carcass record in a database from the mark read at step d; f) obtaining data relatable to the yield of the primal at the station; g) optionally, obtaining data on the quality of the primal at the station; h) passing the information obtained in steps f–g to a computer; i) computing the value of the primal from 1) data obtained in steps f and g, 2) prevailing prices relevant to the components of the primal, said prices being supplied by reference to an external database, and optionally 3) a weighting or weightings dependent upon the quality of the primal; j) adding the value of the primal to the appropriate carcass record; k) repeating steps b to j for every other primal of the carcass which is to be assessed according to the method; and l) adding together the value of all the primals from the carcass assessed according to the method, and the value (however assessed) of the remainder of the carcass not assessed according to the invention.

Alternatively, for either aspect of the invention, identifying machine-readable marks may be applied to primals after they have been removed from the carcass, provided care is taken to avoid the possibility of mixing primals from different carcasses. The methods will then continue at step (c). Either method is particularly suited to operations where the carcass, or its constituent primals, is or are removed from an overhead conveyor at or before step (c). In a preferred method, dressing floor information is incorporated in the mark, either at step (a) or later.

The identifying machine-readable mark may be applied to the at least one primal of the carcass on a label. Preferably, said label will be capable of withstanding short periods at elevated temperatures, especially including in excess of 180° Celsius.

The identifying machine-readable mark is usable as a process control or process monitoring mark, and is usable in this manner in controlling or monitoring processes applied to the article or matter from which the article is derived (e.g. a carcass before the primal is removed from it).

In some instances, it may be considered desirable to include a step of preparing a site e.g. on a carcass, to receive the machine-readable mark (or a label bearing the mark). Such preparation may involve spraying the site with a suitable solvent; the solvent may then be allowed to run off, and/or evaporate (which may be accelerated by directed air jets, for example), or it may be removed by wiping, before the mark is applied. Alternatively or additionally, instead of applying the mark directly to the site, a band of material may be applied (preferably by spraying) to act as a base surface to receive the mark or label. The material, which may be a plastic, a glue, a polysaccharide- or proteinaceous-type material, or a bonding agent, must be capable of adhering firmly to the surface of the primal. It should be permitted for use in contact with food according to the appropriate regulations. The machine-readable mark is applied to the band of material. Because the band ensures the mark does not come into direct contact with the article, e.g. a primal, the mark may be made using a wide variety of inks and dyes which need not themselves be permitted by regulations to come into direct contact with food.

A different approach is to use a mark made of an edible substance. Such "edible" marks can be carbohydrate-, fat-, or protein-based, etc, and the method of applying the mark will generally be determined by the composition of the mark: emulsions, foams, and gels can all be used. Preferably, the edible mark will be made of a gel-forming polymer. Preferably, the gel-forming polymer will be gelatine or alginate.

A protective coating, e.g. of gelatine, may be applied over a mark.

A system for carrying out the method comprises means for applying an identifying machine-readable mark to at least one article, e.g. at least one primal of a carcass (preferably before said primal is removed from the carcass, a reading and assessment station (comprising means for reading said mark and if appropriate, means for obtaining data relatable to the yield of a primal), and a suitably programmed computer. Preferably, the reading and assessment station is further provided with means for obtaining data on the quality of a primal. Preferably, the reading and assessment station is further provided with means for marking a primal. Preferably, the means for reading the mark is a video camera.

The invention also provides, in a further aspect, a method for relating an article, e.g. a carcass cut, to a precursor, e.g. the animal from which said article was derived, comprising a) applying an identifying machine-readable mark to at least one article (or precursor) (e.g. to part of the carcass before said primal is removed); b) removing or otherwise deriving the article from the precursor to obtain a marked article; c) moving the marked article to a reading and assessment station; d) reading the mark on the article at the station and recording the mark; e) identifying the appropriate precursor record in a database from the mark read at step d; f) further processing the article, e.g. dividing the primal into cuts; g) transferring one or a plurality of said further processed articles to a container suitable for conveying them to a downstream user; and h) providing the container with indicia relatable to the said appropriate precursor record. A system based on such a method enables backward tracing from the finished product not only for regulation and control purposes but also to enable any finished product to be traced back through the processing operation, the factory, and the producer to the animal, should suspect, tainted or unwholesome product be detected.

An example of the application of the system to articles other than meat cuts is its use in the egg industry. Individual eggs can be coded. If subsequently an egg is found to be unsatisfactory (e.g. microbially contaminated or inadequately fresh), by reading the mark its history can be learned and it can be related to its 'precursor'—the egg producing farm or battery, or section thereof. More generally, final egg quality can be monitored to find out which sources and which processing techniques are particularly good or bad.

A mark may comprise temperature sensitive ink (e.g. for one dot, which may or may not be part of the coding pattern) such that it can be seen at a glance if an article has been subjected to "temperature abuse". (Of course other types of 'tell-tale' indicia can be used, e.g. marks sensitive to UV or ionising radiation or volatile or gaseous substances.

The term "downstream user" is to be understood as referring to any of a large number of potential links in the meat chain subsequent to dividing the primal into cuts. At one extreme, the user is the consumer when the cut or cuts are sold in the container at retail: for example, the container may comprise a tray with overwrap, a gas-flushed pouch, or a vacuum pack. The user might be a meat wholesaler, for whom such consumer packs (bearing suitable indicia) may be contained within larger containers, such as wholesale packs incorporating a modified atmosphere; the larger container may likewise carry suitable indicia.

Other examples, familiar to those skilled in the art, will be apparent. It will also be apparent to those skilled in the art that this aspect of the invention is very flexible in its applicability; the information transferred to the container as indicia can be varied to match the particular requirements of more than one downstream user. For example, in the example of the wholesale pack, loin chops from a number of different carcasses may be placed individually in trays, overwrapped, and each overwrapped pack then labelled to identify the carcass from which it was derived; the overwrapped packs can then be transferred to a bulk pack, the bulk pack might then be gas-flushed and sealed, and then the bulk pack is provided with indicia showing the processing batch as treated by the gas-flushing apparatus. Thus, any quality defects detected by the consumer can be related back to the original carcass when an animal effect is suspected, but equally can be related to a batch processing effect (for example, an error in composition of the gas mixture used for flushing).

A variety of machine-readable marks are suitable for application, but a preferred mark is in the form of a two-dimensional matrix or grid. Identifying data may be repeated in either direction of the matrix.

A preferred form of mark comprises a two dimensional matrix, the matrix elements being characterised by colour and/or tone. The elements may be of five types, e.g. white elements, black elements, and elements of three different colours. The matrix may have coding rows (or columns) containing elements selected from the five types, and one or more modifying rows (or columns) containing elements of only two types; wherein the five element types are assigned the values 0, 2, 4, 6 and 8 wherein the coding rows (or columns) and the elements in the modifying rows (or columns) represent 0 or 1; and the reading of a mark involves determining the values of marks in coding rows (or columns), determining the values of marks at corresponding locations in modifying rows (or columns) and adding the values of marks in the coding rows (or columns) to the values of respective corresponding marks of a modifying row (or column).

In further aspects the invention provides apparatus for carrying out a method of the invention; and a coding system employing a matrix as defined above.

The invention will now be described with reference to the accompanying drawings in which.

Figure 1:
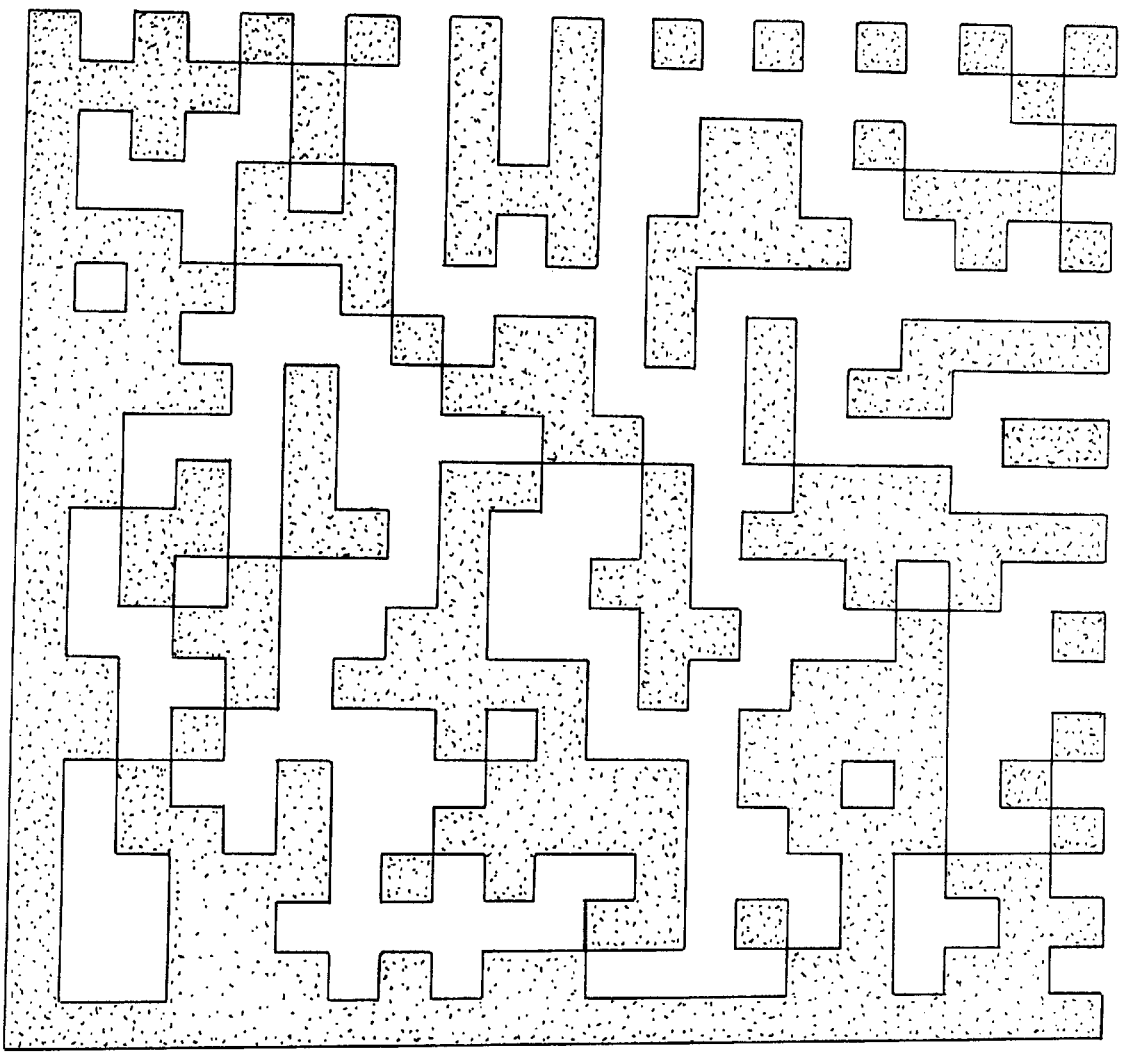
FIG. 1 shows an example of one type of identifying machine-readable mark.

The invention is described with particular reference to the processing of pig carcasses, but this is offered by way of illustration and not of limitation.

At a suitable place after slaughter, a unique carcass identifying machine-readable mark is applied in several places to the outside of a pig carcass. If the marking is repeated at two selected heights, it can be arranged that both hams of the carcass receive one or more marks, and that there are marks on both loins and both bellies. The methods capable of applying such a mark are well known, and may be considered as of two classes: contact methods (for example, hot branding, freeze burning, or ink stamping), and non-contact methods (for example, using air brush, laser, or inkjet technology). Contact methods are less desirable because any regular or continuous contact with the carcass surface will expose the print head to significant amounts of grease, dirt and other organic matter. Alternatively, the machine-readable mark may first be applied to one or more labels by either a contact or non-contact method, and then the label(s) may be affixed to the carcass or primal in the desired position. To obviate the need to prepare the location on the carcass or primal to receive the label, the label should preferably be capable of adhering to both wet and irregular surfaces. In typical pig processing plants the labels should preferably also be able to withstand short periods of elevated temperatures (in excess of 180° C.). Most preferably, the labels should be capable of being reused.

The identifying mark may correspond to a database field stored in computer. Information gathered on the dressing floor (such as ear tag number, animal supplier, weight of the carcass, yield) and quality measurements may be added sequentially to the computer record as they are obtained; this type of system is referred to as a "passive" system.

In an "active" system, the mark is similarly applied at a suitable place after slaughter but dressing floor information is applied directly to the carcass as part of one or more of the code marks in either sequential or concurrent steps.

Following chilling and conditioning, the carcass enters the disassembly area. At this stage, the carcass is separated into two sides by complete removal of the head, unless this has occurred earlier, and the two sides are removed from the gambrel. Disassembly of the sides involves portioning, deboning, and further processing. As each primal and sub-primal is produced (for example, hams, shoulders, loins, and bellies) the presence of the identifying mark allows further yield and quality data to be obtained at various primal measurement and assessment stations.

These data may be added to the computer record in a "passive" system. In an "active" system, in which all the necessary preceding information has been incorporated into the mark, the station's integral CPU performs the calculations, obviating the need for an external computer and associated interfacing.

In an "active" system, further yield and quality data obtained at successive measurement and assessment stations may be added in coded form to the primal as its processing continues, thus building up a continuous record of carcass and primal parameters. This has many applications, such as confirming or improving yield and carcass worth; optimising primal selection; and the addition of data for further optimisation of processing operations (eg determination of pumping volumes for bellies, or for the tracking of material through to the end of production and into the consumer domain to provide confirmation of quality and/or wholesomeness during its various stages of production). In this way, the marks can be considered as process controllers; eg once the information on the mark has been decoded and analysed at a measurement and assessment station, the process can be adjusted to optimise the performance of the item.

A wide variety of marks are suitable, dependent at least in part upon the device chosen to read the mark. High speed video systems can be used as readers, and these are able to identify colour, black & white, and multiple greyscale marks. As a consequence, the mark may comprise alphanumeric or other symbols, one or more lines of coloured dots, bar code, etc. The format may be linear, or 2-dimensional, as in a data-matrix format, such as is shown in FIG. 1. An identifying matrix of the sort shown in FIG. 1 may be designed so that it allows for the same information to be applied both horizontally and vertically so that partial damage to one of the data strings (eg the data string running horizontally) does not prevent identification of the primal as the other data string (ie that running vertically, in this example) can still be read. A variety of algorithms for decoding matrices of this type can be devised, as can algorithms for coping with a partially damaged matrix.

Figure 2:
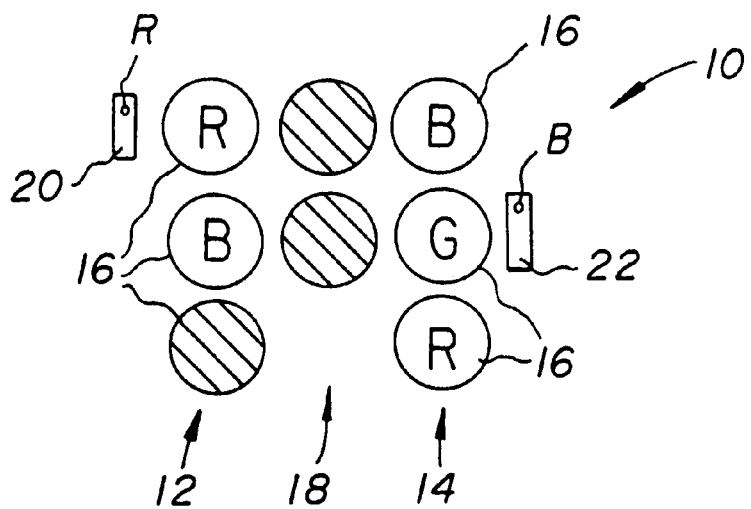
FIGS. 2 and 3 are examples of a second type of mark.
Figure 3:
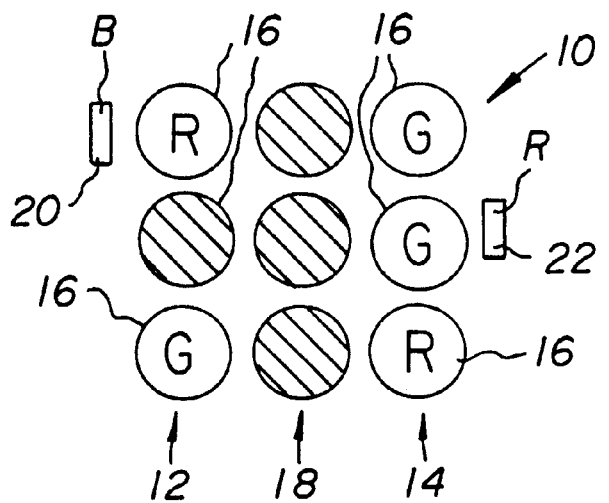

FIGS. 2 and 3 show examples of the currently preferred form of mark. This is a 3×3 matrix 10 having two outer coding columns 12, 14 each containing three dots (matrix elements) 16 of colours selected from the following, with the numerical values as shown:

| | |
|---|---|
| WHITE (i.e. absence): | 0 |
| R (red or magenta): | 2 |
| B (blue or cyan): | 4 |
| G (green or yellow): | 6 |
| black (shown by shading): | 8 |

The central column 18 contains only black and white elements, black representing 1 and white representing zero. The mark also includes orienting bars 20, 22: one (20) to the left of the top row and the other (22) to the right of the middle row. Thus, even if several of the matrix elements are white and/or the matrix is imperfectly drawn or imperfectly read, the bars identify the orientation and the intended locations of the matrix elements.

A matrix may be read as follows. The dots of the coding columns 12, 14 are read successively in a defined order e.g. column 1 row 1/column 3 row 1/column 1 row 2/column 3 row 2/column 1 row 3/column 3 row 3. However each coding column value is modified by adding the value (1 or 0) of the adjacent mark in the central column. Thus FIG. 2 shows a matrix encoding (2+1) (4+1) (6+1) (8+0) (2+0) i.e. 355782. FIG. 3 shows a matrix encoding 379773.

The bars 20, 22 may also be coloured and read to provide further characters. Of course they should not generally be "absence" coloured or their orienting function will be lost. In FIG. 2 they are shown as red and blue, encoding 24, which may be read as the first two characters so that the encoded numeral is 24355782.

Figure 4:
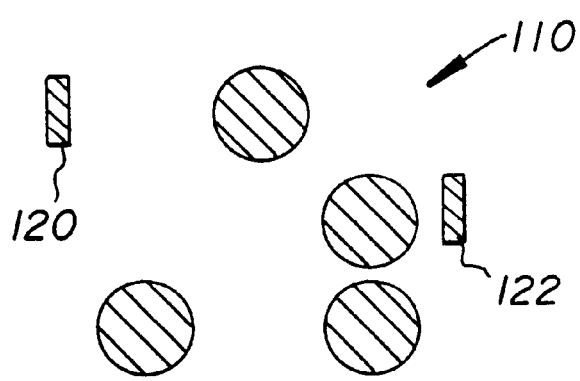
FIG. 4 is an example of a third type of mark.

FIG. 4 shows a simpler, binary code. The pattern of matrix 110 and bars 120, 122 is the same, but the matrix elements are read merely as binary digits, 0 or 1. The example shown in FIG. 4 may be read as 010001101. Alternatively it may be read as an 18 digit number as follows:

| | |
|---|---|
| Row 1 column 1 | = 1st binary digit |
| Row 1 Column 2 | = 2nd binary digit |
| Row 1 column 1 + Row 1 column 2 | = 3rd binary digit |
| Row 1 column 2 | = 4th binary digit |
| Row 1 column 3 | = 5th binary digit |
| Row 1 column 2 + Row 1 column 3 | = 6th binary digit | giving 101011. All 3 rows are interpreted in the same way, thus we get 011101000011101011.

giving 101011. All 3 rows are interpreted in the same way, thus we get 011101000011101011.

Such a binary code can be applied using 4 fixed airbrushes (3 rows of dots and 1 row for orientation line), at a fixed distance from the carcass squirting through a fixed position, fine mesh and a template to ensure even sized dots.

This option also only requires a single monochrome camera per write station.

The colour code, as in FIGS. 2 and 3, requires everything to be multiplied by 4 (since each line must be able to write any of the three colours plus black) together with a colour camera (or b/w with green filter) for each write station.

The code reading process can be conducted as follows:
1. Take picture.
   Continue until valid picture is taken.
2. Check for valid picture by measuring length of orientation bars or identifying their presence. If below minimum set value, return to step 1.
3. If b/w code
   Locate orientation bars and determine X, Y coordinates.
   Locate and identify black dots.
   Determine dot binary value.
   Construct binary string.
   Convert to alphanumeric character.
   Check value against computer record and validate.
4. If any step in item 3 is invalid or item is missing—
   Return to 1.
5. If alphanumeric colour code
   Locate orientation bars and determine colour and X, Y coordinates.
   Using RGB sequence,
   locate and identify colour dots.
   Determine dot binary value.
   Locate and identify black dots.
   Determine dot value.
   Construct alphanumeric string.
   Check value against computer record and validate.
6. If any step in item 5 is invalid or item is missing—
   Return to 1.

The system can also be extended to encompass the marking of individual live animals at an early stage. A young piglet has no hair, therefore at this stage a permanent machine-readable mark may be applied to the skin. Alternatively or additionally an ear tag may use the necessary identification format. Carcass and batch identity can then be made at least semi-automated. Additional forms of identification and/or the multiple occurrence of an identifying mark provide a capability for measurement or identification validation.

The system has been described with pig and pork primals as examples, but the technique can also be applied to poultry, fish, beef, and sheepmeat. Poultry (which like pork retains its skin during early stages of primal breakup) can have the whole carcass and/or breast primals marked. With beef, sheepmeat, and in pork factories where the skin is removed (for example, by loin pulling), the mark may be applied to fat, bone, or muscle, in order of preference.

Figure 5:
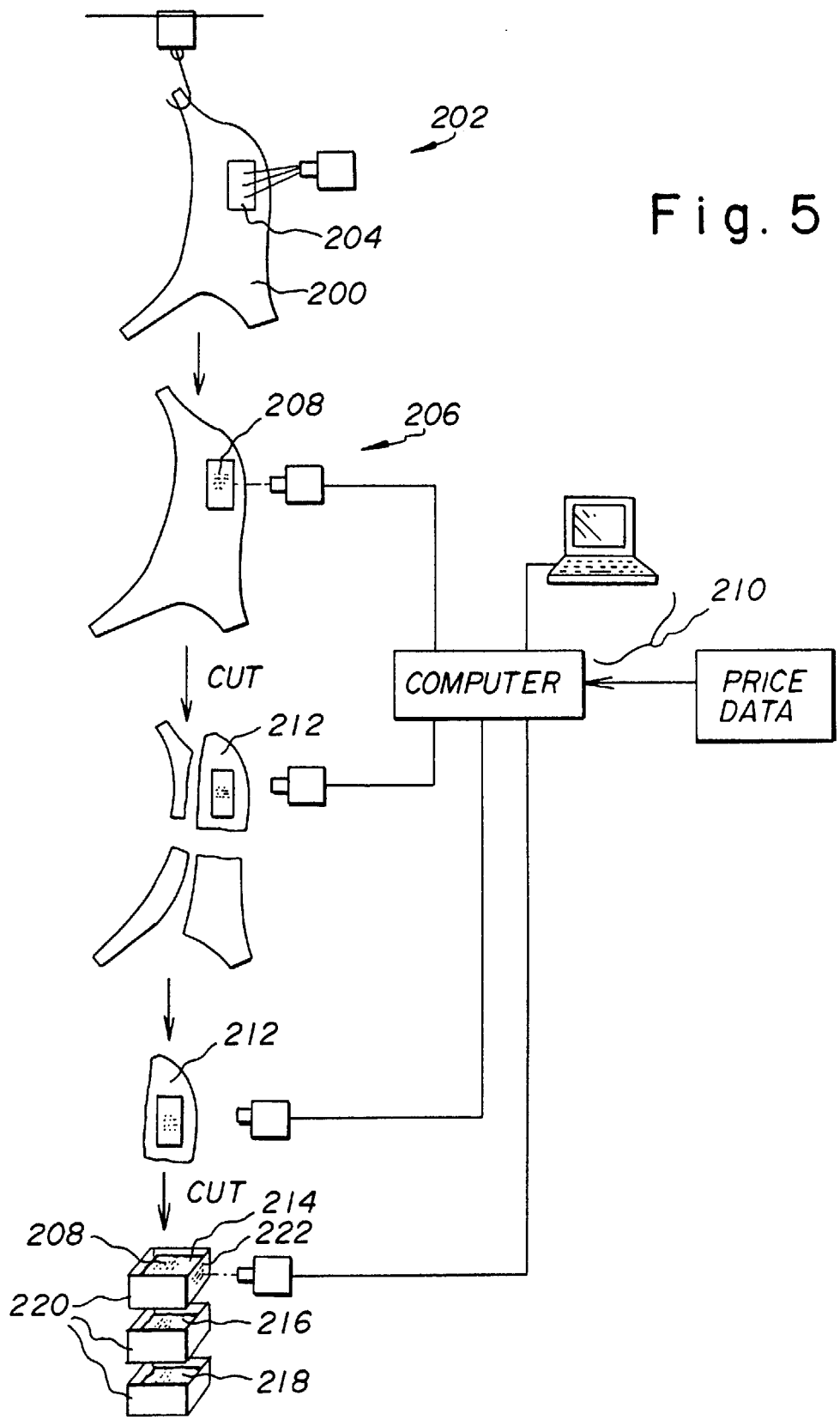
FIG. 5 is a schematic view of apparatus for carrying out the invention.

FIG. 5 schematically shows a system embodying the invention. A carcass 200 is carried on a gambrel to a site preparation station 202 where sites to receive marks are prepared. This example shows a base layer 204 of gelatine being sprayed on. The carcass 200 is moved to a marking station 206 where a mark 208 is applied to each site, under the control of a computer 210. A protective layer, e.g. of gelatine, may be applied over the mark. The carcass 200 is then cut into primals. A marked primal 212 is next shown having its mark 208 read at a monitoring station. The data is fed to the computer, which also receives price data. It is then divided into cuts 214, 216, 218 for sale to consumers. These cuts are placed in containers 220, which may be marked (222) to correspond to marks (208) on the cuts.

What is claimed is:

1. A method of identifying and tracking carcass primals comprising:
    (a) providing a database holding respective records relating to a multiplicity of carcasses;
    (b) moving a carcass comprising a multiplicity of primals into which said carcass is separable to a marking station prior to separation of said primals from said carcass and applying a respective different identifying machine-readable mark to each primal of said carcass, records of said carcass being included in said database, each primal being marked prior to removal from the carcass;
    (c) moving said carcass to a disassembly area and removing at least one marked primal from the carcass;
    (d) moving said marked primal to a reading and assessment station;
    (e) reading the mark on the marked primal at the station and recording the mark;
    (f) identifying an appropriate carcass record in said database from the mark read at step e; and
    (g) passing information about location of the marked primal to a central unit.

2. A method according to claim 1 including steps of: further dividing the primal into cuts; transferring one or a plurality of said cuts to a container suitable for conveying the cut or cuts to a downstream user; and providing the container with indicia relatable to the said appropriate carcass record.

3. A method according to claim 1 wherein prior to application of an identifying machine-readable mark, there is a step of preparing a site to receive the machine-readable mark.

4. A method according to claim 3 where said step of preparing the site comprises application of a band of material to act as a base surface to receive the mark, so that the mark does not come into direct contact with the site.

5. A method according to claim 1 wherein the mark is made of an edible substance.

6. A method according to claim 5 wherein the mark comprises a gel-forming polymer selected from gelatine and alginate.

7. A method according to claim 1 wherein said machine readable mark comprises a two dimensional matrix, the matrix elements being characterised by colour and/or tone.

8. A method according to claim 7 wherein the matrix elements are of "five types."

9. A method according to claim 8 wherein the matrix elements are selected from white elements, black elements, and elements of three different colours.

10. A method according to claim 8 wherein the matrix has coding rows containing elements selected from the five types, and one or more modifying rows containing elements of only two types; and in which the five element types are assigned the values 0, 2, 4, 6 and 8 when in the coding rows and the elements in the modifying rows represent 0 or 1; and the reading of a mark involves determining the values of marks in coding rows, determining the values of marks at corresponding locations in modifying rows and adding the values of marks in the coding rows to the values of respective corresponding marks of a modifying row.

11. A method according to claim 10 wherein the matrix is a 3×3 matrix whereof the central row (or column) is a modifying row and modifies the values in both outer rows.

12. A method according to claim 7 wherein the mark includes one or more orientation marks by which the orientation and reading direction of the matrix are determined.

13. A method according to claim 12 wherein the mark includes two orientation marks on respective different sides of the matrix at different levels so as to define uniquely the positions of the matrix elements.

14. A method according to claim 12 wherein at least one said orientation bar is of a selected colour or tone, and this is read together with the matrix elements to provide further data.

15. Apparatus for carrying out the method of claim 1 comprising means for applying an identifying machine-readable mark, a reading and assessment station comprising means for reading said mark, and a suitably programmed computer.

* * * * *